July 3, 1956

G. H. ANDERSON ET AL 2,752,686

FISHING LINE METERING OR MEASURING DEVICE

Filed July 28, 1954

*INVENTOR.*
GLENDALE H. ANDERSON
ELMER E. MELLUM
BY
*David W. Kilgore*
ATTORNEY

United States Patent Office 2,752,686
Patented July 3, 1956

2,752,686

FISHING LINE METERING OR MEASURING DEVICE

Glendale H. Anderson and Elmer A. Mellum, Stockholm, Wis.

Application July 28, 1954, Serial No. 446,342

1 Claim. (Cl. 33—129)

Our present invention relates broadly to line metering or measuring devices and more particularly to such devices for use in connection with a fishing line.

It is well known that at different seasons of the year, and under certain varying weather and atmospheric conditions, fish will seek certain water depths dependent upon such conditions. It is therefore obvious that under such conditions, the fish being once located, it is highly important and desirable to know that certain depth and to be able to accurately return a bait attached to a fishing line to said certain depth after each retrieve of the line onto the reel. It is also equally as important to know at all times the amount of line that has been stripped from a reel when the bait is being trolled behind a boat.

The principal object of this invention is to provide a metering or measuring device that is mounted on the grip section of a conventional fishing rod whereby a fisherman may instantly determine the amount of line that has been unreeled from a reel arbor and thus make it possible to fish at a depth where fish have been located and/or troll behind a boat at sufficient distance to avoid having water agitation created by the motor or oars freighten the fish or disturb the inherent action of the bait being trolled.

Another object of the invention is to provide a metering or measuring device that is relatively small in size and light in weight that is easily attachable or detachable from the grip section of any conventional fishing rod type, to wit: casting, trolling, and also the cane type pole commonly used for still fishing.

A further object of the invention is to provide a metering or measuring device that may be used in combination with a conventional rod and reel assembly without in any way interfering with the normal action of the same.

A still further object of the invention is to provide a metering or measuring device for use in combination with a conventional rod, reel, and tackle assembly wherein the amount of line unreeled from the arbor of a fishing reel may be used to locate a predetermined water depth or other lineal measurments the same being instantly and accurately indicated by an indicator cooperating and in registration with a scale on which said depths or lengths are indicated.

These and other objects of this invention will be apparent from the following description, reference being had to the drawings.

To the above end, generally stated, the invention consists of the novel parts and arrangement hereinafter described and defined in the claim.

In the accompanying drawing, which illustrates one embodiment of the invention, like characters indicate like parts throughout the several views.

Referring to the drawing.

Figure 1:
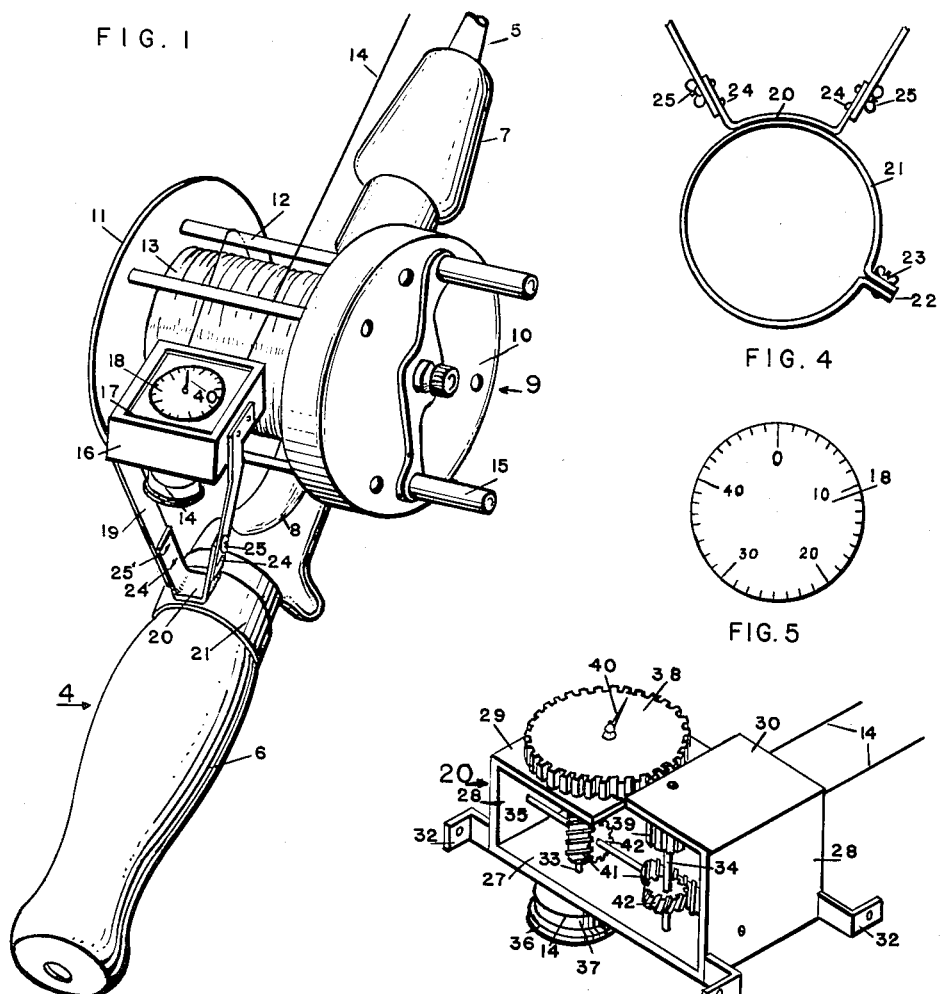
Fig. 1 is a perspective view of the improved line metering device.
Figure 4:
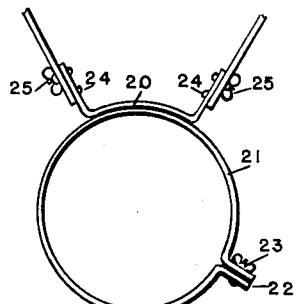
Fig. 4 is a detailed view on an enlarged scale showing the means for clamping a line metering device to the handle section of a fishing rod.
Figure 5:
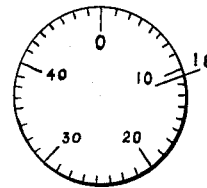
Fig. 5 is a view of the face of the metering dial having graduations at its perimeter.
Figure 2:
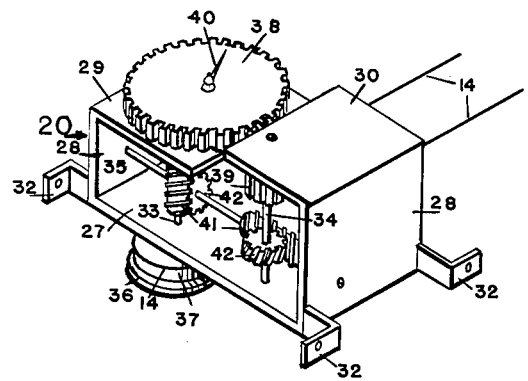
Fig. 2 is a perspective view of the frame removed from the housing case with the meter mechanism mounted thereon.
Figure 3:
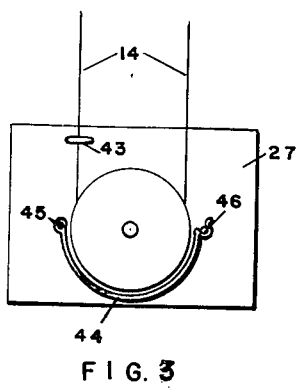
Fig. 3 is a bottom plan view of the frame and sheave as shown in Fig. 2.
Figure 6:
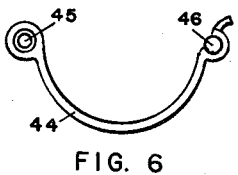
Fig. 6 is a detailed view on an enlarged scale showing the sheave guard for retaining the fishing line on the sheave, particularly when the line is slack.

For the purpose of showing the improved fishing line meter for measuring, a section of fishing line is shown unwound from a conventional reel that is attached to the grip or butt section of a fishing rod. Of the parts of a conventional fishing rod it is important to note the grip section 4 to which is attached a fragment of the lower rod section 5, the lower grip 6, the upper grip 7, and the reel seat 8. A reel 9 is removably mounted in the reel seat 8 in the conventional manner. Of the parts of the reel it is important to note the head plate 10, the tail plate 11, the cross-tie rod 12, and the arbor 13, on which is wound a fishing line 14, and the handles 15 for turning the arbor 13.

Referring now in detail to the improved fishing line meter, the numeral 16 indicates a rectangular housing case having a displaceable cover 17. Applied to the outer upper surface of the cover 17, is an annular dial 18, graduated at its perimeter to indicate yards, as shown, fifty.

Fixed to each side of the case 16 is an outwardly and downwardly extended arm 19 that overlaps an upstanding prong 20 fixed to a divided collar 21 which encircles the lower grip 6. The end portions of the collar are turned outwardly to afford a pair of ears 22 connected by a nut equipped bolt 23. The arms 19 are pivoted at 24 to the prongs 20 and are adjustably secured thereto by nut equipped bolts 25 that extend through holes in the prongs 20 and slots 25' in the arms 19. Obviously this arrangement of attaching the prongs 20 to the arms 19, permits the case 16 to be adjusted either forwardly or rearwardly relative to the lower grip 6.

A frame 26 is removably held in the case 16, and as shown, is formed of sheet metal folded to form a bottom member 27, end members 28, and a top member 29 that includes a lower section 30 and an upper section 31. Fixed to the frame end members 28 are L-shaped ears 32, secured to the case 16 by screws, not shown.

An upright shaft 33 is journaled in the bottom member 27 and the lower top section 30, and a second upright shaft 34 is journaled in the bottom member 27 and the upper top section 31. A horizontal shaft 35 is journaled in the end members 28.

Fixed to the shaft 33 below the bottom member 27 is a sheave 36 having a grooved periphery with a friction surface 37 and, loose on said shaft, above the lower top section 30, is a large spur gear 38 that meshes with a spur pinion 39 fixed to the shaft 34 below the top upper section 31. The shaft 33 extends upwardly through a hole in the cover 17 and fixed to the gear 38 is a pointer 40 that cooperates with the graduations on the dial 18.

Worm gears fixed on shafts 33 and 35 mesh respectively with worm pinions 42 fixed on shafts 35 and 34. The section of the fishing line 14 is first extended forwardly to engage the conventional levelwind mechanism of the reel thence rearwardly under the case 16, through an eye 43 fixed to the underside of the bottom member 27 thence around the sheave 36 one-half turn and then extended forwardly and longitudinally of the fishing rod 5.

As the fishing line 14 is unwound from the reel 9 it turns the sheave 36 and the shaft 33. The worm gears 41 and worm pinions 42 in turn rotate the shaft 34. The pinion 39 on the shaft 34 turns the gear 38 with which it meshes and which gear swings the pointer 40 relative to the graduations on the dial 18 which indicates the length of fishing line unwound from the reel 9.

A semi-circular guard member 44 is provided to keep the fishing line 14 in position on the friction groove 37 in the sheave 36. This guard member 44 halfway encircles the sheave 36 at the rear portion thereof and is pivoted at 45 to the bottom member 27 at one of its ends. The other end portion thereof is shaped to engage and snap on a pin 46 fixed on said section. The guard 44 is thus permitted to swing open and away from the sheave 36 thereby permitting access to the sheave to facilitate adjusting the line 14 thereon. It will be understood that the guard 44 closely encircles the sheave 36 with a very close working fit that permits free rotation of the sheave but still preventing the line from working out of engagement with the sheave in the event of slack in the line.

While there are herein disclosed but a limited number of embodiments of the structure, process and product of the invention herein presented, it is possible to produce still other embodiments without departing from the inventive concept herein disclosed, and it is desired therefore, that only such limitations be imposed on the appended claim as are stated herein or imposed by the prior art.

What we claim is:

A fishing line meter for a fishing reel and rod including a case having a graduated dial, a pivoted pointer cooperating with the graduations on the dial, a clamping collar applicable to the grip section of the fishing rod and having a pair of upstanding prongs, a pair of arms fixed to the case and pivoted to the prongs, means holding the case in different tilted positioned relative to the grip section, and means actuated by the unwound portion of the fishing line as the same is wound on or unwound from the reel for turning the pointer relative to the graduations on the dial.

References Cited in the file of this patent

UNITED STATES PATENTS

| | | |
|---|---|---|
| 382,193 | Ross | May 1, 1888 |
| 1,577,035 | Klein | Mar. 16, 1926 |
| 2,576,629 | Morby | Nov. 27, 1951 |
| 2,637,112 | La Fontaine et al. | May 5, 1953 |